(12) United States Patent
Smith et al.

(10) Patent No.: US 7,028,771 B2
(45) Date of Patent: Apr. 18, 2006

(54) HYDROCARBON RECOVERY

(75) Inventors: Kevin W. Smith, Houston, TX (US); Rusty R. Mackey, Cochrane (CA); John H. Hallman, New Waverly, TX (US)

(73) Assignee: Clearwater International, L.L.C., Houston, TX (US)

( * ) Notice: Subject to any disclaimer, the term of this patent is extended or adjusted under 35 U.S.C. 154(b) by 0 days.

(21) Appl. No.: 10/159,176

(22) Filed: May 30, 2002

(65) Prior Publication Data

US 2003/0221825 A1    Dec. 4, 2003

(51) Int. Cl.
C09K 7/02       (2006.01)
E21B 21/06     (2006.01)
E21B 49/00     (2006.01)

(52) U.S. Cl. .............. 166/250.01; 166/294; 166/293; 507/141; 507/136; 507/276; 507/110; 175/40; 175/65

(58) Field of Classification Search ........... 507/140, 507/141, 136, 276, 110; 166/250.01, 294, 166/293; 175/40, 65
See application file for complete search history.

(56) References Cited

U.S. PATENT DOCUMENTS

| | | | |
|---|---|---|---|
| 2,761,835 A | 9/1956 | Brown | |
| 2,761,836 A | 9/1956 | Brown | |
| 2,761,840 A | 9/1956 | Brown | |
| 2,761,843 A | 9/1956 | Brown | |
| 3,349,032 A | 10/1967 | Kreig | |
| 4,164,979 A | 8/1979 | Nooner | |
| 4,366,071 A | 12/1982 | McLaughlin et al. | |
| 4,366,072 A | 12/1982 | McLaughlin et al. | |
| 4,447,342 A | 5/1984 | Borchardt et al. | |
| 4,507,210 A | 3/1985 | Lauzon | |
| 4,536,297 A | 8/1985 | Loftin et al. | |
| 4,647,859 A | 3/1987 | Son et al. | |
| 4,693,639 A | 9/1987 | Hollenbeak et al. | |
| 4,765,445 A * | 8/1988 | Komossa et al. | 188/266.2 |
| 4,841,066 A | 6/1989 | Goertz et al. | |
| 4,842,073 A | 6/1989 | Himes et al. | |
| 4,900,457 A * | 2/1990 | Clarke-Sturman et al. | 507/103 |
| 4,925,247 A | 5/1990 | Hjelmstad | |
| 5,169,441 A | 12/1992 | Lauzon | |
| 5,196,401 A * | 3/1993 | Engelmann et al. | 507/120 |
| 5,211,239 A | 5/1993 | Thomas et al. | |
| 5,363,918 A | 11/1994 | Cowan et al. | |
| 5,489,674 A | 2/1996 | Yeh | |
| 5,514,644 A * | 5/1996 | Dobson | 507/111 |
| 5,536,825 A | 7/1996 | Yeh et al. | |
| 5,620,947 A * | 4/1997 | Elward-Berry | 507/229 |
| 5,629,271 A | 5/1997 | Dobson et al. | |
| 5,635,458 A | 6/1997 | Lee et al. | |
| 5,785,747 A | 7/1998 | Vollmer et al. | |
| 5,846,308 A | 12/1998 | Lauzon | |
| 5,916,849 A * | 6/1999 | House | 507/110 |
| 6,006,831 A | 12/1999 | Schlemmer et al. | |
| 6,100,222 A | 8/2000 | Vollmer et al. | |
| 6,124,244 A | 9/2000 | Murphey | |
| 6,315,824 B1 | 11/2001 | Lauzon | |
| 6,359,040 B1 | 3/2002 | Burdick | |
| 6,689,204 B1 | 2/2004 | Stanley | |
| 2002/0008225 A1* | 1/2002 | Smith | 252/73 |
| 2002/0139530 A1* | 10/2002 | Smith | 166/292 |
| 2003/0092580 A1* | 5/2003 | Mackey et al. | 507/100 |
| 2003/0114315 A1* | 6/2003 | Schwartz et al. | 507/121 |
| 2003/0121658 A1* | 7/2003 | Conaway et al. | 166/267 |
| 2003/0125215 A1* | 7/2003 | Schwartz et al. | 507/121 |
| 2005/0137114 A1* | 6/2005 | Gatlin et al. | 510/424 |

FOREIGN PATENT DOCUMENTS

| | | |
|---|---|---|
| CA | 2 374 486 | 11/2000 |
| WO | WO 95/14066 | 5/1995 |

OTHER PUBLICATIONS

Colloidal Dynamics Pty Ltd., "The Clay Minerals", downloaded from www.colloidal-dynamics.com, 1999, 6 pages.*
O'Brien et al, Measuring Zeta Potential, Mar. 2, 2002, 7 pages, downloaded from http://www.ceramicindustry.com/CDA/ArticleInformation/features/BNP_Features_Item/0,2710,73678,00.html.*
Colloidal Dynamics, The Zeta Potential, Electroacoustics Tutorials, 1999, 4 pages, downloaded from http://www.colloidal-dynamics.com/CDEITut1.pdf.*
Central Chemical Consulting, Rheology: the chemistry of particles, 2 pages undated, downloaded from http://www.chem.com.au/science/rheology/rheology3/.*
Brookhaven Instruments Corporation, Zeta Potential and Colloidal Behavior, 2 pages, undated, donwloaded from http://www.bic.com/Zeta_Theory.html.*
Brookhaven Instruments Corporation, What is Zeta Potential?, 2 pages, undated, downloaded from http://www.bic.com/WhatisZetaPotential.html.*

(Continued)

Primary Examiner—Katherine Mitchell
(74) Attorney, Agent, or Firm—Patterson & Sheridan, LLP

(57) ABSTRACT

Low concentrations, 1–10% of potassium salt, especially potassium formate, are used in a drilling fluid in oil production. Preferably they are used with guar derivatives, most preferably carboxymethyl hydroxypropyl guar. The concentration of potassium formate is maintained at the desired level by adjusting the potassium formate to maintain a desired Zeta potential in the circulating drilling fluid. The potassium formate/guar derivative composition may be used in the substantial absence of hydrophilic clay additive.

42 Claims, No Drawings

OTHER PUBLICATIONS

Brookhaven Instruments Corporation, Zeta Potential Applications, 5 pages + 5 pages showing all text, undated, downloaded from http://www.bic.com/ZetaPotentialApplications.html.*

O'Brien "Zeta Potential" Quintessence Publishing, Apr. 1996, 1 page, downloaded from http://www.lib.umich.edu/dentlib/Dental_tables/Zetapot.html.*

Ceram Research, Inc. "Zeta Potential" undated, Ceram Research Inc, 5 pages, downloaded from www.azom.com/details.asp?ArticleID=935&head=Zeta%2BPotential.*

Ronald P. Steiger, Fundamentals and Use of Potassium/Polymer Drilling Fluids To Minimize Drilling and Completion Problems Associated With Hydratable Clays, Aug. 1982, Society of Petroleum Engineers of AIME, SPE 10100, p. 1661-1670.

R. E. Himes, E. F. Vinson, and D. E. Simon, Clay Stabilization in Low-Permeability Formations, Society of Petroleum Engineers, SPE 18881, pp. 252-262, Aug. 1991.

Siv K. Howard, Formate Brines For Drilling and Completion: State of the Art, Society of Petroleum Engineers, SPE 30498, pp. 483-496.

Thomas W. Beihoffer, David S. Dorrough, Calvin K. Deem, Donald D. Schmidt, and Ronald P. Bray, Cationic Polymer Drilling Fluid Can Sometimes Replace Oil-Based Mud, Oil & Gas Journal, pp. 47-52, Mar. 16, 1992.

* cited by examiner

HYDROCARBON RECOVERY

TECHNICAL FIELD

In the recovery of hydrocarbons from the earth, a low concentration of potassium formate is used in aqueous drilling fluid, preferably with a viscosifying amount of polygalactomannan the concentration of potassium formate being controlled as a function of Zeta potential of the drilling fluid.

BACKGROUND OF THE INVENTION

Potassium salts have been used to help to control the intrusion of shale and clay into fluids produced from subterranean formations. The presence of potassium in brines which come in contact with shale and clay in underground formations will inhibit the absorption of sodium into the brine from the clay or shale, thus reducing permeability damage. However, it has been difficult to determine and control the optimum amounts of potassium to use.

The use of potassium formate in formation treatment fluids containing cationic formation control additives is disclosed by Kevin W. Smith in U.S. Pat. No. 6,502,637. In U.S. Pat. No. 6,454,005, Kevin W. Smith discloses the use of potassium formate together with guar for reducing permeability damage by formation treatment fluids.

The capillary suction test is known as a method widely used to determine the tendency of clay and shale to adsorb potassium ions. Performance of a brine in the capillary suction test (CST) is used as a guide to the quantity of potassium deemed to be necessary to stabilize the formation, particularly to inhibit sloughing of shale and swelling of clay. Lauzon, in U.S. Pat. No. 4,507,210, teaches the use of the capillary suction test and/or Zeta potential to adjust or formulate a clay and shale treatment medium which may include a hydroxypropyl guar gum (column 5, lines 58–59) for minimizing swelling and dispersion of subterranean formation particles. A Zeta potential is the potential at the shear interface created by a colloidal or other particle moving through a liquid medium with its associated ions, in an electric field. Zeta potentials have been used as part of a method to extend bit life—see the review of the art in Engelmann et al. U.S. Pat. No. 5,196,401, col. 2 lines 22–36 as well as FIG. 2. Zeta potentials have been used to study clay control in the presence of polymers, in uranium mining—see Hjelmstad in U.S. Pat. No. 4,925,247.

In U.S. Pat. No. 5,489,674 to Yeh and U.S. Pat. No. 5,536,825 to Yeh et al., the authors discuss guar gum as a natural polygalactomannan. They go on to describe various derivatives of guar, including carboxymethyl hydroxypropyl guar—see column 5, line 49 of U.S. Pat. No. 5,489,674 and line 51, column 5 of U.S. Pat. No. 5,536,825. At line 23 of column 3 of Dobson et al., U.S. Pat. No. 5,629,271, carboxymethyl_hydroxypropyl guar is mentioned as a possible viscosifier and suspending agent in a "clay-free" formation treatment fluid which, however, includes an "ultra fine filtrate reducing agent."

The full benefits of the varied elements of the prior art discussed above have yet to be realized in the well drilling and related arts.

SUMMARY OF THE INVENTION

We have determined that the prior art has generally overestimated the amount of potassium necessary to stabilize clay and shale during the hydrocarbon recovery process. Potassium formate is particularly effective in low concentrations. Further, the small amounts of potassium formate able to stabilize the clay and shale can be maintained by replenishing it as a function of the Zeta potential of the drilling fluid.

Our invention provides that an optimum concentration of potassium salt can he maintained in a drilling or formation treatment fluid by monitoring the Zeta potential of the drilling or formation treatment fluid and adjusting the potassium salt concentration as a function thereof. We prefer to use potassium formate in the drilling or formation treatment fluid, but our invention is applicable to the use of any potassium salt in a drilling or formation treatment fluid. Accordingly, our invention includes the intermittent measurement of Zeta potentials, so that the potassium content of the circulating drilling fluid can be adjusted according to the results as the potassium formate is consumed or its concentration varies with other conditions, such as at different depths of the application of the fluid—that is, in different strata.

We have found that, when low concentrations of potassium formate are used together with a polygalactomannan (including derivatives such as the guar derivative carboxymethylhydroxypropyl guar), it is not necessary to include a bentonitic clay or other solid hydrophilic material with a drilling fluid. Our invention includes the use of low concentrations (1–10%, preferably 2–6% by weight) of potassium formate in drilling and formation treatment fluids, as the only significant source of potassium ions, in the substantial absence of an added solid hydrophilic clay. By a solid hydrophilic clay, we mean bentonite, attapulgite, sepialite, or any other hydrophilic clay which might conventionally be added to the drilling fluid.

Preferably, our invention includes the use of a combination of a low concentration (1–10% by weight) of potassium formate and a viscosifying amount of carboxymethyl hydroxypropyl guar. We may use the hydroxymethylhydroxypropyl guars described in the above identified Yeh patents, which are hereby incorporated by reference in their entirety.

DETAILED DESCRIPTION OF THE INVENTION

A typical drilling formulation within our invention comprises an aqueous solution of (a) 1% to 10%, preferably 2% to 6%, by weight potassium formate and (b) 0.0 1% to 1.2% of a polygalactomannan or derivative thereof, preferably 0.1% to 1% by weight. Preferably the polygalactomannan is carboxymethyl hydroxypropyl guar. The percentages are by weight based on the completed drilling fluid. We also may include calcium carbonate in an amount desired to help control circulation loss or to increase the density of the drilling fluid, i.e. up to 50% by volume of the drilling fluid. With this composition, with or without the calcium carbonate, it is frequently not necessary to use a bentonitic clay or other hydrophilic clay to form a mud. Thus our invention includes a method of treating a hydrocarbon producing formation to stabilize shale and clay therein comprising contacting the hydrocarbon producing formation with an aqueous formation treatment fluid comprising 1% to 10% by weight of potassium formate and 0.01% to 1.2% of a guar derivative, in the substantial absence of a hydrophilic clay drilling additive, and recirculating the aqueous formation treatment fluid in the formation. In order to maintain the potassium formate concentration in the formation treatment fluid, the Zeta potential may be determined on samples of circulating drilling fluid containing particles of shale or clay encountered in the well; the potassium formate concentration in the fluid is adjusted within the range of 1% to 10% to maintain a desired Zeta potential having an absolute value greater than 15 and correlated to the desired potassium formate concentration.

The use and measurement of Zeta potentials is well known, but it should be understood that the above stated values of Zeta potentials are in terms of millivolts. Millivolts are a commonly used unit for the expression of Zeta potentials as determined in a Zeta-Meter. The Zeta potential is a measure of the difference in static charge between (1) a particle and any associated modifying substances or ions and (2) the liquid in which it is suspended. Readings are taken while the particles and the suspending medium are subjected to a DC current, and the readout is a function of the velocity of the suspended particle, taking into account the viscosity and other factors. When we use the term Zeta potential herein, we mean to include the electrophoretic mobility from which the Zeta potential is derived, as well as any other expression which is a direct function of Zeta potential. By a "Zeta potential having an absolute value greater than 15" we mean that the Zeta potential in millivolts, as a function of electrophoretic mobility of the shale and clay particles in the measurement sample) is either greater than +15 or lower than −15.

Tables 1 and 2 show that there is little or no correlation between capillary suction time (CST) and Zeta potentials when the potassium salt used is potassium sulfate, but a correlation is evident for potassium formate.

In Tables 1 and 2, both the CST and Zeta potential were measured in suspensions of Jean Marie shale at varying concentrations of potassium sulfate for Table 1 and potassium formate for Table 2.

TABLE 1

Potassium sulfate; 2% Jean Marie Shale

| % $K_2SO_4$ | CST, seconds | Zeta P |
|---|---|---|
| 0 | 103 | −34 mv |
| 0.1 | 70 | −44 mv |
| 0.5 | 56.1 | −37 mv |
| 1 | 40 | −38 mv |
| 5 | 23 | −44 mv |
| 10 | 21 | −44 mv |

TABLE 2

Potassium Formate; 2% Jean Marie Shale

| % KCOOH | CST, Seconds | Zeta P |
|---|---|---|
| 0 | 68 | −35 mv |
| 0.1 | 35.4 | −33.5 mv |
| 0.3 | 21.1 | −33 mv |
| 2.3 | 18.7 | −23 mv |
| 4.8 | 16.9 | −29 mv |
| 9 | 19.5 | −25 |

Table 3 also shows a correlation between CST and potassium formate concentration.

TABLE 3

Potassium Formate; 2% Black Stone Shale

| % KCOOH | CST, Seconds | Zeta P |
|---|---|---|
| 0 | 155.3 | −60 mv |
| 0.1 | 103.7 | −30 mv |
| 0.3 | 57.8 | −27.2 mv |
| 2.3 | 28 | −24.6 mv |
| 4.8 | 21.9 | −25 mv |
| 9 | 22.8 | −28 mv |

Tables 4 and 5 demonstrate the correlations of CST to Zeta potential for low concentrations of potassium formate in solutions of varying viscosity. Viscosity was imparted by varying concentrations of a random copolymer of 20% acrylic acid and 80% diallyl dimethyl ammonium chloride, designated as "Polymer".

TABLE 4

Potassium Formate; Jean Marie Shale

| % KCOOH | % Polymer | CST, seconds | Zeta Potential |
|---|---|---|---|
| 0 | 0 | 59 | −40 mv |
| 0.16 | 0 | 35.7 | −19 mv |
| 0.16 | 0.03 | 12.1 | −10 mv |
| 0.16 | 0.05 | 15.3 | +14 mv |
| 0.16 | 0.08 | 25.6 | +15 mv |

TABLE 5

Potassium Formate; Fernie Shale

| % KCOOH | % Polymer | CST, seconds | Zeta Potential |
|---|---|---|---|
| 0 | 0 | 270 | −45 |
| 1.10 | 0 | 70 | −28 mv |
| 1.10 | 0.02 | 26.6 | −22 mv |
| 1.10 | 0.08 | 14.4 | −21 mv |
| 1.10 | 0.18 | 14.6 | −18 mv |
| 1.10 | 0.24 | 20 | −22 |

Thus, our invention is seen to include a method of treating a hydrocarbon producing formation to stabilize shale and clay therein comprising contacting the hydrocarbon producing formation with a formation treatment fluid comprising 1% to 10% by weight of potassium salt, determining the Zeta potential of the well treatment fluid, and adjusting the potassium formate content of the well treatment fluid to maintain a Zeta potential therein at an absolute value greater than 15.

Further, our invention includes a method of treating a hydrocarbon producing formation to stabilize shale and clay therein comprising contacting the hydrocarbon producing formation with an aqueous formation treatment fluid comprising 1% to 10% by weight of potassium formate, 0.01% to 1.2% of a guar derivative, and up to 50% by volume of calcium carbonate, in) the substantial absence of a hydrophilic clay drilling fluid additive, in particular where the drilling fluid is recirculated and the percentage of potassium formate is maintained during the recirculation by monitoring the Zeta potential of the drilling fluid and adding potassium formate thereto to maintain the Zeta potential at an absolute value greater than 15. Our invention further includes a method of drilling a wellbore in an earth formation while stabilizing shale and clay therein comprising (a) drilling the wellbore in the formation with an aqueous drilling fluid comprising from 1% to 10% by weight of potassium formate and 0.01% to 1.2% of a polygalactomannan, (b) collecting at least one sample slurry of shale or clay particulates obtained from drilling in the earth formation, (c) determining the Zeta potential of the sample slurry in the drilling fluid, and (d) adding or refraining from adding potassium formate to the drilling fluid to maintain the potassium formate to maintain the Zeta potential within a desired range. In particular, the desired Zeta potential range has an absolute value greater than 15 and the drilling fluid is recirculated, followed by at least one iteration of the method of steps (a), (b), (c) and (d) wherein the desired Zeta potential has an absolute value greater than 15.

The invention claimed is:

1. A method for treating a hydrocarbon producing formation to stabilize shale and clay therein, comprising:
   contacting the hydrocarbon producing formation with a treatment fluid containing a potassium formate concentration by weight within a range from about 1% to about 10%;
   determining a first Zeta potential of the treatment fluid; and
   adjusting the potassium formate concentration to maintain the treatment fluid within a Zeta potential of about −15 mV or less.

2. The method of claim 1, wherein the treatment fluid includes a viscosifying amount of a polygalactomannan.

3. The method of claim 2, wherein the polygalactomannan comprises a guar compound.

4. The method of claim 3, wherein the guar compound comprises a carboxymethyl hydroxypropyl guar compound or derivative thereof.

5. The method of claim 1, wherein the potassium formate concentration is within a range from about 2% to about 6%.

6. The method of claim 5, wherein the treatment fluid further comprises a carboxymethyl hydroxypropyl guar compound at a concentration within a range from about 0.1% to about 1% by weight of the treatment fluid.

7. The method of claim 6, wherein the treatment fluid further comprises calcium carbonate.

8. The method of claim 1, further comprising intermittently measuring the Zeta potential of the treatment fluid during treatment of the formation.

9. The method of claim 1, wherein the Zeta potential is about −18 mV or less.

10. The method of claim 9, wherein the Zeta potential is about −21 mV or less.

11. The method of claim 10, wherein the Zeta potential is about −25 mV or less.

12. A method for treating a hydrocarbon producing formation to stabilize shale and clay therein, comprising:
   contacting the hydrocarbon producing formation with a treatment fluid containing potassium formate at a concentration by weight of about 10% or less and a capillary suction time of about 70 seconds or less; and
   adjusting the concentration of the potassium formate to maintain the treatment fluid within a Zeta potential of about −15 mV or less.

13. The method of claim 12, wherein the treatment fluid includes a viscosifying amount of a guar compound.

14. The method of claim 13, wherein the guar compound has a concentration by weight of the treatment fluid within a range from about 0.01% to about 1.2%.

15. The method of claim 14, wherein the guar compound comprises a carboxymethyl hydroxypropyl guar compound or derivative thereof.

16. The method of claim 12, wherein the treatment fluid further comprises calcium carbonate.

17. The method of claim 12, wherein the treatment fluid comprises a drilling fluid.

18. The method of claim 17, further comprising collecting at least one sample slurry of shale or clay particulates from the drilling fluid.

19. The method of claim 18, further comprising determining a first Zeta potential of the at least one sample slurry and adjusting the potassium formate concentration to maintain the drilling fluid within a predetermined Zeta potential range.

20. The method of claim 19, further comprising recirculating the drilling fluid.

21. The method of claim 12, further comprising intermittently measuring the Zeta potential of the treatment fluid during treatment of the formation.

22. The method of claim 12, wherein the concentration of the potassium formate is about 1.1% or less and the capillary suction time is about 26.6 seconds or less.

23. The method of claim 22, wherein the Zeta potential is about −22 mV or less.

24. The method of claim 23, wherein the concentration of the potassium formate is about 0.3% or less and the capillary suction time is about 21.1 seconds or less.

25. The method of claim 24, wherein the Zeta potential is about −27.2 mV or less.

26. The method of claim 12, wherein the Zeta potential is about −18 mV or less.

27. The method of claim 26, wherein the Zeta potential is about −21 mV or less.

28. The method of claim 27, wherein the Zeta potential is about −25 mV or less.

29. The method of claim 28, wherein the Zeta potential is about −29 mV or less.

30. The method of claim 29, wherein the Zeta potential is about −33 mV or less.

31. A method for treating a hydrocarbon producing formation to stabilize shale and clay therein, comprising:
   contacting the hydrocarbon producing formation with a treatment fluid containing potassium formate at a concentration by weight of about 10% or less and a capillary suction time of about 70 seconds or less;
   determining a first Zeta potential of the treatment fluid; and
   adjusting the concentration of the potassium formate to maintain the treatment fluid within a desired Zeta potential range.

32. The method of claim 31, further comprising maintaining a Zeta potential at about −15 mV or less.

33. The method of claim 32, wherein the Zeta potential is about −18 mV or less.

34. The method of claim 33, wherein the Zeta potential is about −21 mV or less.

35. The method of claim 34, wherein the Zeta potential is about −25 mV or less.

36. The method of claim 31, wherein the treatment fluid includes a viscosifying amount of a guar compound.

37. The method of claim 36, wherein the guar compound has a concentration by weight of the treatment fluid within a range from about 0.01% to about 1.2%.

38. The method of claim 37, wherein the guar compound comprises a carboxymethyl hydroxypropyl guar compound or derivative thereof.

39. A method for treating a hydrocarbon producing formation to stabilize shale and clay therein, comprising:
  contacting the hydrocarbon producing formation with a treatment fluid containing potassium formate at a concentration by weight within a range from about 2% to about 6%;
  determining a first Zeta potential of the treatment fluid; and
  adjusting the concentration of the potassium formate to maintain a Zeta potential of the treatment fluid at about −15 mV or less.

40. The method of claim 39, wherein the Zeta potential is about −18 mV or less.

41. The method of claim 40, wherein the Zeta potential is about −21 mV or less.

42. The method of claim 41, wherein the Zeta potential is about −25 mV or less.

* * * * *